United States Patent [19]
Brück et al.

[11] Patent Number: 5,994,416
[45] Date of Patent: Nov. 30, 1999

[54] PROCESS FOR RECYCLING POLYARYLENE SULFIDES

[75] Inventors: Martin Brück, Weilrod; Andreas Schleicher, Beselich, both of Germany

[73] Assignee: Ticona GmbH, Frankfurt, Germany

[21] Appl. No.: 08/817,150

[22] PCT Filed: Oct. 2, 1995

[86] PCT No.: PCT/EP95/03900

§ 371 Date: May 19, 1997

§ 102(e) Date: May 19, 1997

[87] PCT Pub. No.: WO96/11968

PCT Pub. Date: Apr. 25, 1996

[30] Foreign Application Priority Data

Oct. 13, 1994 [DE] Germany .............. 44 36 636
Oct. 28, 1994 [DE] Germany .............. 44 38 447
Dec. 13, 1994 [DE] Germany .............. 44 44 247

[51] Int. Cl.$^6$ .............. C08J 11/04; C08J 6/00; C08F 2/00
[52] U.S. Cl. .............. 521/43; 526/67; 526/68; 526/69; 528/491; 528/493; 528/497
[58] Field of Search .............. 528/491, 493, 528/497; 526/67, 68, 69; 421/43

[56] References Cited

U.S. PATENT DOCUMENTS 5,039,788  8/1991  Bobsein et al. .............. 528/481

FOREIGN PATENT DOCUMENTS 0202537  11/1986  European Pat. Off. .
0594186   4/1994  European Pat. Off. .
60-235838 11/1985  Japan .

*Primary Examiner*—Morton Foelak

[57] ABSTRACT

The present invention relates to a process for obtaining polyarylene sulfide from polyarylene sulfide-containing material. For this purpose, the polyarylene sulfide-containing material is treated with a solvent in which it dissolves, and is subsequently reprecipitated. The invention also relates to the purification of polyarylene sulfide-containing material by separating off extraneous substances, to polyphenylene sulfide particles having a specific surface area of at least 80 m$^2$/g and to their use as filter material.

23 Claims, No Drawings

PROCESS FOR RECYCLING POLYARYLENE SULFIDES

The invention relates to a process for recycling polyarylene sulfides (PAS), in which the polyarylene sulfide recovered has the same, possibly improved product properties compared with conventionally prepared starting material.

The "material recycling" of polyarylene sulfide waste for reuse has hitherto been limited to the melting of puregrade, uncontaminated production waste or off-specification batches. In this case it is possible to use only polyarylene sulfide waste of identical or similar composition, in particular with identical additions and filler contents, since otherwise an alteration in the properties of the polymer material must be accepted. Repeated thermal stressing in the course of reuse lead in general to a loss of quality in the polymer material.

DE-C-34 33 978 reports that the repeated thermal stressing of polyarylene sulfide produces deficient or excessive crosslinking, which in linear polyarylene sulfide starting materials signifies an impairment of the flow properties and viscoelastic properties.

In general, a large number of fillers in plastics, such as glass fibers or mineral substances, are damaged when processed a subsequent time. In the case of fiber-rein-forced plastics, for example, repeated extrusion in the course, for example, of an injection molding process severely reduces the average fiber length of reinforcing fibers, so that the mechanical properties of a plastic worsen with each processing step (so-called downgrading).

EP 0 461 655 A1 describes how polyarylene sulfide particles having a low content of oligomer and ash are obtained from a liquid reaction mixture which comprises polyarylene sulfide, polar organic solvent and water, by cooling the mixture. The method is part of a preparation process for polyarylene sulfide.

The object of the invention is the recovery of polyarylene sulfide from materials comprising it, especially waste materials, where the content and the nature of fillers or additives, impurities or contamination and the age of the material should be irrelevant and the recovered polyarylene sulfide should also be suitable for recompounding.

The invention provides a process for obtaining polyarylene sulfide from polyarylene sulfide-containing material, in which the polyarylene sulfide-containing material is treated with a solvent, the polyarylene sulfide dissolving and being subsequently precipitated.

The invention also provides for the purification of polyarylene sulfide-containing material, where the polyarylene sulfide-containing material is dissolved, undissolved polyarylene sulfide oxidation products, polyarylene sulfide ageing products, degradation products, composition products, additives or fillers are separated off, and the polyarylene sulfide is precipitated from the resulting solution.

The polyarylene sulfide is precipitated by cooling the polyarylene sulfide solution, spontaneously evaporating the solvent (flashing) ot, preferably, by mixing with a liquid medium. The term liquid medium refers here to water and/or an organic or inorganic solvent in which polyarylene sulfide has little or no solubility. It is advantageous if the liquid medium dissolves oligomers and/or other impurities. Solvents suitable for this purpose are those having an aldehyde or keto group, such as acetone, or aromatic solvents such as toluene. A liquid medium which is miscible with water, for example acetone, can contain water. It is advantageous if the liquid medium is miscible with the solvent for dissolving PAS. The liquid medium can also be composed of a mixture of solvents. A mixture can comprise, for example, the solvent used for dissolving PAS.

The use of acetone or of acetone-containing solvent mixtures as the liquid medium is particularly advantageous in precipitating PAS, since acetone has a good take-up capacity for soluble constituents, such as impurities of the polyarylene sulfide used for the purification. Acetone has also proved to be favorable for washing the precipitated polyarylene sulfide. Soluble constituents or impurities are, for example, unconverted reactants in the preparation of PAS, soluble oligomers formed during the preparation, soluble additives, amine compounds and sulfide compounds.

The dissolution of the polyarylene sulfide-containing materials or of polyarylene sulfide can be carried out either in a solvent a) with heating or b) with heating under pressure.

If the polyarylene sulfide material employed in the process according to the invention is provided with fillers, these insoluble constituents are separated off after the dissolution process. This separation can be carried out by filtration, sedimentation, centrifugation or other methods familiar to the person skilled in the art. Undissolved constituents are advantageously separated off by filtration at the dissolution temperature. An example of the filter devices which can be employed comprises single-rail filters. If the polyarylene sulfide material contains other substances which are not dissolved in the dissolution procedure, these can likewise be removed by filtration.

Examples of insoluble constituents are metals, insoluble polymers such as PTFE, oxidation products of the PAS, aging products, and nonmetals, such as ceramic materials.

Following the dissolution procedure and, if desired, the separation of undissolved constituents, the polyarylene sulfide present in the solution is obtained by precipitation or reprecipitation in a liquid medium. The liquid medium is introduced initially, in a ratio of from 1:1 to 1:100, preferably from 1:5 to 1:10, as an excess based on polyarylene sulfide. The reprecipitation can be carried out either at temperatures below room temperature, i.e. less than 20 to 30° C., or else at up to the maximum dissolution temperature, by introducing the polymer solution into the liquid medium with vigorous stirring, for example. The precipitation is followed by a single-stage or multistage washing procedure with fresh liquid medium, followed by drying.

By varying the precipitation conditions, the form and morphology of the particles obtained can be influenced. For example, dropwise addition of the polymer solution with vigorous stirring leads to flocculent structures. If, on the other hand, the solution is added dropwise to a stationary, i.e. not agitated, medium, the result is a spherical form of polyarylene sulfide particles.

Solvents for PAS which can be employed in the process according to the invention are in general high-boiling with boiling points of up to 400° C. Suitable solvents for PAS are mono- or polycyclic organic compounds having 6 to 25 carbon atoms, which are unsubstituted or are substituted with halogen, preferably chlorine or bromine, with alkoxy groups having 1 to 4 carbon atoms in the alkyl radical, or with aryl groups. These compounds can also carry phenolic OH groups. Examples of suitable solvents are triphenylmethane, tetraphenylmethane, the various mono-, di- and trichlorobenzenes, N-methylpyrrolidone, 1,2,3-triphenylbenzene, 2- and 4-phenylphenol, 2,6-diphenylphenol, 2,4,6-trichlorophenol, 1- or 2-chloronaphthalene, 1-bromonaphthalene, 1- and 2-methoxynaphthalene, 1-ethoxynaphthalene, 2,6- and 2,7-dimethoxynaphthalene, 1-phenylnaphthalene, benzophenone, acetophenone, 4,4'-dimethoxybenzophenone, 4,4'-diphenylbenzophenone, and also caprolactam, N-methylcaprolactam, N-ethylcaprolactam, quinoline, isoquinoline and 1-cyclohexyl-2-pyrrolidone or mixtures of the solvents listed. Particularly preferred solvents are chloronaphthalene, methoxynaphthalene, benzophenone or quinoline when dissolution is carried out with heating (dissolution variant a)) and anisole or chlorobenzene when dissolution is carried out with heating under pressure (dissolution variant b)).

It is advantageous to use solvents in which impurities of the PAS employed remain dissolved. By means of this effect, it is possible to achieve purification when cooling and precipitating the PAS. Purification can also be achieved on spontaneous evaporation of the solvent, for example by removing evaporable impurities.

The polyarylene sulfide-containing material is treated with the solvents at temperatures of from 150° C. to 360° C., preferably from 180° C. to 260° C., with dissolution taking place. The resulting solution is of low viscosity. Dissolution is generally carried out under atmospheric pressure. However, the polyarylene sulfide material can also be dissolved under elevated pressure. In the latter procedure, precipitation in a liquid medium can be dispensed with if the solution is depressurized via a nozzle, for example in a heated spray tower, to produce fine particles of polyarylene sulfide powder. If the solution contains solid constituents, these can be removed by pressure filtration prior to spray drying. If the procedure is carried out under pressure and the solution is introduced into a heated spray tower, the solvent can be removed via the top and condensed. The heat capacity of the solution is sufficient for complete evaporation of chlorobenzene, for example, so that additional drying is still necessary only under certain conditions.

If the polymer solution under elevated pressure is depressurized spontaneously by release into a liquid medium, fibrous aggregates, for example, are obtained. This method also brings about an additional purification effect in relation to spray drying.

In chemical terms, the polyarylene sulfide product obtained in the process according to the invention corresponds to the polyarylene sulfide material employed as starting material. Over and above this, however, particular desired properties can be subjected to specific alteration and/or improvement. Thus it is possible, depending on the nature of reprecipitation, the reprecipitation temperature, the reprecipitating agent, the solvent and the polymer concentration in the solution, to influence, for example, the morphology, the crystalline content, the molecular weight distribution, the average molecular weight and, as already mentioned, the morphology of the product. At this point, reference is made to German Patent Application P 44 38 447.5 filed on Oct. 28, 1994 with the title: "Polyarylene sulfide parts of high specific surface area and process for their preparation", in which these alterations to properties are discussed in detail. In general, the specific surface area of the resulting particles and the amorphous fraction in the resulting polyarylene sulfide material are increased.

PAS particles having a high specific surface area can be prepared by the process according to the invention. A high specific surface area of PAS particles is particularly advantageous for filter material or adsorbent applications in the removal of ozone and $NO_2$, for example. The use of PAS as ozone filter material is described in the German Application bearing the file reference P 43 14 734.8 of May 4, 1993 U.S. Pat. Nos. 5,423,902 and 5,593,594) with the title: "Filter material and method of removing ozone from gases and liquids", to which reference is hereby made.

A particularly high specific surface area of polyarylene sulfide particles is [lacuna] by dissolving the polymer at atmospheric or superatmospheric pressure and at temperatures in the range from 180 to 360° C. in a solvent, cooling the polymer solution to room temperature and treating the cooled solution with a liquid at room temperature in which the polymer does not dissolve (for example acetone). Washing with the liquid and drying under gentle heat give polyarylene sulfide particles having a specific surface area of at least 80 $m^2/g$. By following a specific procedure it is possible to prepare polyarylene sulfide particles having a specific surface area of around 180 $m^2/g$, for example.

Characterization methods used are differential scanning calorimetry (DSC), time sweep (time swp.) and frequency sweep (freq. swp.) Theological analysis, thermogravimetry (TG), settling temperature, BET surface area, GC/MS analysis and X-ray diffractometry (XRD).

Examples of polyarylene sulfide containing material which is suitable for use in the process according to the invention are so-called recyclate, i.e. waste from the processing of polyarylene sulfide, and polyarylene sulfide material which has been collected for recovery, for example used parts of appliances which no longer function, and other processed polyarylene sulfide shaped parts. This can be of pure polymer or of polymer blended with fillers and/or reinforcing agents.

Polyarylene sulfides which are sent for recovery are linear or branched polyarylene compounds containing the repeating unit of the formula (I) which comprise at least one arylene thioether group,

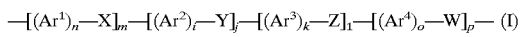

in which $Ar^1$, $Ar^2$, $Ar^3$, $Ar^4$, W, X, Y and Z, independently of one another, are identical or different. The indices n, m, i, j, k, l, o and p are integers zero, 1, 2, 3 or 4, the sum of which must be at least 2. $Ar^1$, $Ar^2$, $Ar^3$ and $Ar^4$ in the formula (I) are simple arylene systems or arylene systems which are directly para-, meta- or ortho- linked, having 6 to 18 carbon atoms W, X, Y and Z are linking groups selected from —$SO_2$—, —S—, —SO—, —O—, —CO—, —$CO_2$—, alkylene or alkylidene groups having 1 to 6 carbon atoms, and —$NR^1$— groups, in which $R^1$ is alkyl or alkylidene groups having 1 to 6 carbon atoms. According to their chemical structure, the aryl systems of the formula (I) can additionally comprise, independently of one another, one or more common functional groups, examples being alkyl radicals, halogens, or sulfo, amino, nitro, cyano, hydroxyl or carboxyl groups. It is also possible to employ block copolymers comprising units of the formula (I).

A preferred polyarylene sulfide is polyphenylene sulfide (PPS), with the repeating unit —$C_6H_4$—S—, which are described in "Ullmann's Encyclopedia of Industrial Chemistry", Volume A21, B. Elvers, S. Hawkins and G. Schultz. (Eds.), VCH, Weinheim-New York 1992, p. 463, and to which reference is made. The synthesis of polyarylene sulfides containing sulfone groups is described in Chimia 28(9), (1974) 567.

Polyphenylene sulfide generally contains 1,4-linked aromatic units. It may also comprise, in a proportion of up to 50 mol %, 1,2- and/or 1,3-linkages of the aromatic units.

Suitable polyarylene sulfides are generally those having an average molecular weight $M_w$ of from 4000 to 200,000, preferably from 10,000 to 150,000 and, in particular, from 25,000 to 100,000, as determined by gel permeation chromatography. Polyarylene sulfide oxidation products are polyarylene sulfides whose sulfur bridges (—S—) have been partially or completely converted to sulfoxide (—SO—) or sulfone (—SO—) groups and which are no longer soluble in organic solvents for polyarylene sulfides. Examples of polyarylene sulfide aging products are crosslinked polymers which are no longer soluble in organic solvents for polyarylene sulfides. Polyarylene sulfide degradation products are relatively short-chain polyarylene sulfides which can comprise chemically altered or cleaved arylene units or parts thereof and which have solubility characteristics which are different from those of the polyarylene sulfides. The polyarylene sulfide degradation products can be of higher or lower solubility in the organic solvents than the unaltered polyarylene sulfides, as a result of which separation is possible.

The recovered polyarylene sulfide can be used again as an engineering plastic without any losses in quality in terms of properties relative to the material obtained from the synthesis. Because of the increase in the specific surface area, the recovered polyarylene sulfide is suitable, for example, as a material for pollutant filters or adsorbents.

The process for recovering PAS can be carried out a number of times without a loss in quality.

EXAMPLES 1) 30 g of polyphenylene sulfide powder (PPS for short) having an average particle size of 1 mm, prepared according to U.S. Pat. No. 3,354,129, are introduced into 300 ml of 1-chloronaphthalene and the mixture is heated to 235° C. in an apparatus fitted with stirrer, thermometer and condenser, during which the PPS material dissolves completely. The solution is heated at the dissolution temperature for a further 45 minutes.

1a): The hot polymer solution is added dropwise with vigorous stirring to 3 l of cooled acetone (at about 0° C.) (hot reprecipitation).

1b): The polymer solution is allowed to cool to room temperature (about 25° C.). A gelatinous polymer solution is formed. The polymer solution is taken up in 3 l of acetone at room temperature with vigorous stirring. The polymer precipitates (cold reprecipitation).

The reprecipitated product from 1a) or 1b) is filtered off through a suction filter with silk filter element and then washed intensely with acetone and water. Resuspension in acetone followed by renewed filtration with suction and washing complete the purification procedure. Drying is carried out at 70° C. under reduced pressure to constant weight.

The yields and properties of the products compared with the untreated PPS material employed are listed in Table 1.

2) Example 1 was repeated using 1-methoxynaphthalene as solvent. The yields and properties of the products are listed in Table 1.

TABLE 1

|  | Starting material | Product of Example 1 | | Product of Example 2 | |
| --- | --- | --- | --- | --- | --- |
|  |  | 1a | 1b | 2a | 2b |
| Yield [%] | — | 97.1 | 96.0 | 97.2 | 96.8 |
| Melting point [°C.] | 273 | 275 | 274 | 280 | 279 |
| Heat of crystallization [J/g] | −37.9 | −34.8 | −36.7 | −38.7 | −41.8 |
| Specific surface area [m$^2$/g] | 30.3 | 134.1 | 84.5 | 178.2 | 59.2 |

Table 1 shows that the melting points of the products are increased relative to the starting material, which increase can be attributed to an elevation of the degree of purity. The change in the specific surface area of the recovered products is striking. The ratio of amorphous to crystalline component in the products was determined qualitatively using an X-ray diffractometer. The evaluation indicated an increase in the amorphous component in comparison with the starting material employed, especially if the reprecipitation is carried out at maximum dissolution temperature. At room temperature, the ratio of amorphous to crystalline component is comparable with that of the starting material. Viscosity analyses of the unprecipitated material indicated no additional crosslinking through the temperature treatment during dissolution of the PPS. The average molecular weight remained constant or showed a slight decrease. The reduction in the average molecular weight is probably the result of the separation of oligomeric components in the PPS employed, during the process.

3) 2 g of a recyclate of fiber-reinforced PPS having a glass fiber content of 40% by weight were introduced together with 50 ml of 1-chloronaphthalene into an apparatus as described in Example 1 (1b) and heated to 240° C. The separation was carried out using an oil-heated filter element having a single-layer filter. The product was reprecipitated in acetone at 25° C. It was worked up and characterized as described in Example 1. The values obtained corresponded to those of the values described in Table 1.

4a) The PPS material from Example 1a) reprecipitated at room temperature was treated again in accordance with Example 1a). The properties of the product were no different from those of the products from Example 1 (treated once).

4b) Repeated precipitation of the product from Example 4 showed unchanged properties.

5) Recyclate of unfilled PPS was treated with chlorobenzene in an autoclave. The vapor pressure of chlorobenzene which developed at the temperatures indicated in Table 2 was in the range from $9 \times 10^5$ to $1.4 \times 10^6$ Pa. At a residence time of 20 minutes at the dissolution temperatures stated, the concentrations indicated in Table 2 were obtained. The subsequent spontaneous depressurization of the highest concentration mentioned, via a nozzle into a heated spray tower, gave a finely particulate PPS powder. The solvent was taken off via the top and condensed. The results of analysis by DSC, time sweep and frequency sweep showed no differences in dissolution temperatures in comparison with the starting material.

TABLE 2

| Temperature [° C.] | PPS concentration [% by wt.] |
|---|---|
| 235 | 10 |
| 239 | 20 |
| 242 | 30 |
| 245 | 40 |
| 250 | 50 |
| 260 | 60 |

6) Properties of PPS ($M_w$ 90,000)

The pore volume and the filter characteristics with respect to ozone of various PPS samples with different specific surface areas were determined.

The specific surface area was determined in accordance with the BET method by nitrogen adsorption using an instrument from Fisons Inst.

Gas Supply Parameters for Ozone Capacity Analyses of PPS:

Ozone concentration: 10 g/m$^3$

Oxygen flow: 100l/h

Residence time: 0.5–1 second

Mass flow $O_3$: 1 g/h

Weight of PPS sample: 6.2 g

PPS sample 6.1 (Table 3) consists of PPS powder (sample 7.2) stored at 250° C. for 2 hours.

PPS sample 6.2 (Table 3) is untreated PPS powder ($M_w$ 90,000) having a particle size of 0.2 to 1 mm.

PPS sample 6.3 (Table 3) consists of PPS which was subjected to hot reprecipitation in 1-chloronaphthalene.

PPS sample 6.4 (Table 3) consists of PPS which was subjected to cold reprecipitation in methoxynaphthalene.

TABLE 3

| Sample | Spec. surface area/m$^2$/g | Pore volume/ cm$^3$/g | Loading capacity/ % |
|---|---|---|---|
| 6.1 | 2.72 | 0.058 | no filter action |
| 6.2 | 30.3 | 0.301 | 16.3 |
| 6.3 | 84.5 | 0.764 | 21.5 |
| 6.4 | 178.2 | 1.045 | not determined |

We claim:

1. A process for recovering polyarylene sulfide from polyarylene sulfide waste, comprising:
   a. dissolving the polyarylene sulfide component of said waste in a solvent, said polyarylene sulfide waste containing a material insoluble in said solvent, and optionally an impurity, a contaminant, or a combination thereof, until a solution containing said polyarylene sulfide component is obtained;
   b. separating off said material from said solution,
   c. precipitating polyarylene sulfide from said solution, wherein, in said precipitating step:
      said solution is mixed with a liquid medium, comprising a compound having a keto group, in which the dissolved polyarylene sulfide component has insufficient solubility to remain in solution,
      said liquid medium dissolves any said impurity or contaminant or combination thereof,
      the ratio of said solution to said liquid medium ranges from 1:1 to 1:100,
      and polyarylene sulfide is selectively precipitated while the impurity or contaminant or combination thereof remains in solution; and
   d. recovering polyarylene sulfide particles having sufficient purity for recompounding.

2. The process as claimed in claim 1, wherein said polyarylene sulfide waste is a powder, a granular material, a shaped part, or deformation waste.

3. The process as claimed in claim 1, wherein said solvent is a mono- or polycyclic organic compound having 6 to 25 carbon atoms.

4. The process as claimed in claim 3, wherein said organic compound is substituted with halogen, an alkoxy group having 1 to 4 carbon atoms in the alkyl radical thereof, or an aryl group.

5. The process as claimed in claim 1, wherein said dissolving step is carried out at a temperature from 150° C. to 360° C.

6. The process as claimed in claim 5, wherein said precipitating step is carried out at a temperature ranging from room temperature to maximum dissolving temperature.

7. The process as claimed in claim 1, wherein said dissolving step is carried out under elevated pressure.

8. The process as claimed in claim 1, wherein said polyarylene sulfide comprises polyphenylene sulfide.

9. The process as claimed in claim 1, wherein said precipitating step is carried out by incremental addition of said solution to a liquid medium to obtain flocculated or spherical polyarylene sulfide particles.

10. The process as claimed in claim 1, wherein said polyarylene sulfide waste contains a polyarylene sulfide oxidation product, a polyarylene sulfide aging product, a degradation product, a metal, a polymer other than a polyarylene sulfide, a ceramic material, or a combination thereof, said products, metal, polymer, or ceramic material being separated from said polyarylene sulfide component by said process.

11. The process as claimed in claim 1, wherein said polyarylene sulfide waste contains a filler.

12. The process as claimed in claim 9, wherein said particles have a specific surface area of at least 80 m$^2$/g.

13. Polyarylene sulfide particles prepared by the process of claim 12.

14. An absorbent or filter material comprising the particles of claim 13.

15. The process as claimed in claim 1, wherein said dissolving step is carried out at a temperature from 180° C. to 260° C.

16. A process for obtaining polyarylene sulfide from polyarylene sulfide-containing material, said process comprising:

dissolving the polyarylene sulfide-containing material in an organic solvent, the resulting solution containing dissolved polyarylene sulfide-containing material, and subsequently precipitating polyarylene sulfide from said solution with a liquid medium containing an organic compound which is an aromatic compound, a compound having an aldehyde group, a compound having a keto group, or a mixture thereof.

17. A process as claimed in claim 16, wherein said liquid medium comprises acetone.

18. A process as claimed in claim 16, wherein said dissolving step is carried out under elevated pressure and the resulting solution is under pressure.

19. A process as claimed in claim 18, wherein the resulting solution under pressure is depressurized spontaneously by release into said liquid medium.

20. A process as claimed in claim 18, wherein said organic solvent is anisole or chlorobenzene.

21. The process as claimed in claim 16, wherein the polyarylene sulfide-containing material employed is recyclate in the form of powder, granules, shaped parts or deformation waste.

22. A process as claimed in claim 16, wherein said dissolving step is carried out with heating, and said organic solvent is chloronaphthalene, methoxynaphthalene, benzophenone, quinoline, or a combination thereof.

23. A process as claimed in claim 1, wherein said liquid medium comprises acetone.

* * * * *